(12) United States Patent
Howell et al.

(10) Patent No.: US 12,423,484 B2
(45) Date of Patent: Sep. 23, 2025

(54) PATTERN GENERATOR FOR ARCHITECTURAL PRODUCT MANUFACTURE

(71) Applicant: DIRTT ENVIRONMENTAL SOLUTIONS LTD., Calgary (CA)

(72) Inventors: Joseph S. Howell, Uintah, UT (US); Sheldon T. A. Smith, Calgary (CA); Anatoliy Pidlubnyy, Calgary (CA)

(73) Assignee: DIRTT ENVIRONMENTAL SOLUTIONS LTD. (CA)

( * ) Notice: Subject to any disclaimer, the term of this patent is extended or adjusted under 35 U.S.C. 154(b) by 988 days.

(21) Appl. No.: 17/423,227

(22) PCT Filed: Mar. 3, 2020

(86) PCT No.: PCT/US2020/020826
§ 371 (c)(1),
(2) Date: Jul. 15, 2021

(87) PCT Pub. No.: WO2020/205135
PCT Pub. Date: Oct. 8, 2020

(65) Prior Publication Data
US 2022/0075910 A1   Mar. 10, 2022

Related U.S. Application Data (60) Provisional application No. 62/829,547, filed on Apr. 4, 2019.

(51) Int. Cl.
*G06F 30/20* (2020.01)
*G06F 30/12* (2020.01)
(Continued)

(52) U.S. Cl.
CPC ............. *G06F 30/13* (2020.01); *G06F 30/12* (2020.01); *G06F 30/20* (2020.01); *G06F 2111/20* (2020.01)

(58) Field of Classification Search
CPC .......... G06F 30/13; G06F 30/20; G06F 30/12; G06F 2111/20
See application file for complete search history.

(56) References Cited

U.S. PATENT DOCUMENTS

| | | |
|---|---|---|
| 5,568,391 A | 10/1996 | McKee |
| 2011/0131525 A1* | 6/2011 | Majumder .............. G06F 30/39 715/802 |

(Continued)

FOREIGN PATENT DOCUMENTS

| | | |
|---|---|---|
| EP | 2996055 | 3/2016 |
| WO | 2020/205135 A1 | 10/2020 |

OTHER PUBLICATIONS

International Preliminary Report on Patentability received for PCT Patent Application No. PCT/US2020/020826, mailed on Oct. 14, 2021, 7 pages.

(Continued)

*Primary Examiner* — Kibrom K Gebresilassie
(74) *Attorney, Agent, or Firm* — Workman Nydegger (57) ABSTRACT

Generating patterns for architectural product manufacture. Defining a repeating pattern that is used for a layout design and displaying a visualization that represents the repeating pattern. Defining a design area of architecture and displaying a second visualization that represents the design area of architecture. The repeating pattern is then applied to the design area of architecture to complete the layout design of the design area. The second visualization that represents the design area of architecture includes the applied repeating pattern. Thereafter, information related to one or more components that are required to implement the layout design of the design area is generated.

19 Claims, 9 Drawing Sheets

(51) Int. Cl.
    *G06F 30/13*     (2020.01)
    *G06F 111/20*     (2020.01)

(56) References Cited

U.S. PATENT DOCUMENTS

| | | | |
|---|---|---|---|
| 2014/0108953 A1* | 4/2014 | Greene | G06F 3/04842 715/747 |
| 2016/0070825 A1* | 3/2016 | Yao | G06T 19/20 703/1 |

OTHER PUBLICATIONS

International Search Report and Written Opinion of PCT/US2020/020826 mailed Jul. 6, 2020.
Office Action received for European U.S. Appl. No. 20/716,035, mailed on Jul. 29, 2025, 8 pages.

\* cited by examiner

PATTERN GENERATOR FOR ARCHITECTURAL PRODUCT MANUFACTURE

CROSS-REFERENCE TO RELATED APPLICATIONS

This application is a 371 US nationalization of PCT Patent Application No. PCT/US2020/020826, filed Mar. 3, 2020, which claims priority to U.S. provisional patent application No. 62/829,547, filed Apr. 4, 2019. The entire content of the aforementioned patent applications is incorporated herein by reference.

BACKGROUND

Architectural designs often include layout designs of dropped ceilings, floor tiles, wall panels, and other designs that involve designing a pattern and repetitively laying out the designed pattern in an area of architecture. Such type of designs often requires measuring the design area, designing the patterns, laying out the patterns, determining the required components, manufacturing the components, and integrating the components with the building's infrastructure. In such a layout design, many different types of components may be used in one design area. For example, when designing a dropped ceiling, a designer may consider using one or more different types of ceiling tiles, light fixtures, T-bars, and/or cross beams. The designer not only needs to design a pattern of how these different components are to be laid out, but also needs to design the edging and orientation of the layout of the pattern.

A modern CAD software may be used to simulate the design area, and a designer may use the CAD software to lay out piece by piece the components on the simulated design area to visualize the intended design. When a change is made to an existing design, the designer is often required to manually move each of the components to simulate the change. For example, if the designer wants to change the orientation of an existing layout slightly, he/she may have to manually adjust each of the components in the CAD software. Additionally, in some cases, the designed layout may result in the pattern fall unevenly on different edges of the surface. In such a case, the designer may need to manually and tediously adjust each of the components in order to balance the pattern.

One will appreciate in view of this disclosure that there are several problems in the field to be addressed. The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

At least some embodiments described herein relate to computing systems and methods for generating patterns for architectural product manufacture. The computer system may be caused to perform the method. The method includes defining a repeating pattern that is used for architecture design and displaying a visualization that represents the repeating pattern. The method also includes defining a design area of architecture and displaying a second visualization that represents the design area of architecture. The repeating pattern is then applied to the design area of architecture to complete the layout design of the design area. The second visualization that represents the design area of architecture includes the layout design of the repeating pattern. Thereafter, information related to one or more components that are required to implement the layout design of the design area is generated.

In some embodiments, the defining the repeating pattern may include displaying a third visualization that represents multiple design elements that may be implemented in the repeating pattern. A first user input may select one of the multiple design elements that is to be implemented. Next, a second user input may indicate the position where the selected design element is to be placed on the repeating pattern. The multiple design elements may include multiple geometric elements. The multiple geometric elements may include one or more of the following (1) a polygon, (2) a parallel lane line, and (3) a T-line.

In some embodiments, the design area of architecture is defined as a polygon, including three or more sides. The polygon may be defined by the length of each one of the three or more sides. The defining the design area may include receiving information related to the design area from a CAD application. Alternatively, or in addition, the defining the design area may include receiving a user input that defines one or more parameters of the design area.

In some embodiments, the applying the repeating pattern to the design area may include automatically laying out the repeating pattern to fill the design area of architecture in a predetermined orientation and/or a pre-determined position. Alternatively, or in addition, the applying the repeating pattern may include receiving a user input indicating an orientation and/or a position of the repeating pattern that is applied to the design area.

In some embodiments, the generated information related to one or more components may include information related to one or more types of tiles, one or more beams, T-bars, and/or connectors that are required to implement the architecture design of the design area. Such information may include a total number of beam or T-bars that are required and/or a length of each of the one or more beams and/or T-bars. Such information may also include a shape of each type of tiles and/or a total number of the corresponding type of tiles that are required to implement the architecture design.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

At least some embodiments described herein relate to computing systems and methods for generating patterns for architectural product manufacture. The computer system may be caused to perform the method. The method includes defining a repeating pattern that is used for architecture design and displaying a visualization that represents the repeating pattern. The method also includes defining a design area of architecture and displaying a second visualization that represents the design area of architecture. The repeating pattern is then applied to the design area of architecture to complete the layout design of the design area. The second visualization that represents the design area of architecture includes the layout design of the repeating pattern. Thereafter, information related to one or more components that are required to implement the layout design of the design area is generated.

In some embodiments, defining the repeating pattern may include displaying a third visualization that represents multiple design elements that may be implemented in the repeating pattern. A first user input may select one of the multiple design elements that is to be implemented. Next, a second user input may indicate the position where the selected design element is to be placed on the repeating pattern. The multiple design elements may include multiple geometric elements. The multiple geometric elements may include at least one of the following (1) a plurality of different polygons, (2) one or more parallel lines, and (3) one or more T-lines.

In some embodiments, the design area of architecture is defined as a polygon, including three or more sides. The polygon may be defined by the length of each one of the three or more sides. The defining the design area may include receiving information related to the design area from a CAD application. Alternatively, or in addition, the defining the design area may include receiving a user input that defines one or more parameters of the design area.

In some embodiments, the applying the repeating pattern to the design area may include automatically laying out the repeating pattern to fill the design area of architecture in a pre-determined orientation and/or a pre-determined position. Alternatively, or in addition, the applying the repeating pattern may include receiving a user input indicating an orientation and/or a position of the repeating pattern that is applied to the design area.

In some embodiments, the generated information related to one or more components may include information related to one or more types of tiles, one or more beams and/or T-bars that are required to implement the architecture design of the design area. Such information may include a total number of beam or T-bars that are required and/or a length of each of the one or more beams and/or T-bars. Such information may also include a shape of each type of tiles and/or a total number of the corresponding type of tiles that are required to implement the architecture design.

The principles described herein provide a technical advance to architecture designs that involve laying out repeating patterns in a design area of architecture. A designer does not have to lay out each single design element on a large design area. Instead, the designer only needs to design a small repeating pattern, and the system automatically applies the designed repeating pattern on the design area to complete the architecture design of the design area and generates information related to the components that are required to implement the architecture design. The generated component information may be used to estimate the costs of the material, and/or to manufacture and/or order these components.

Because the principles described herein may be performed in the context of a computing system, some introductory discussion of a computing system will be described with respect to FIG. 1. Then, this description will return to the principles of generating patterns for architecture manufacture with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
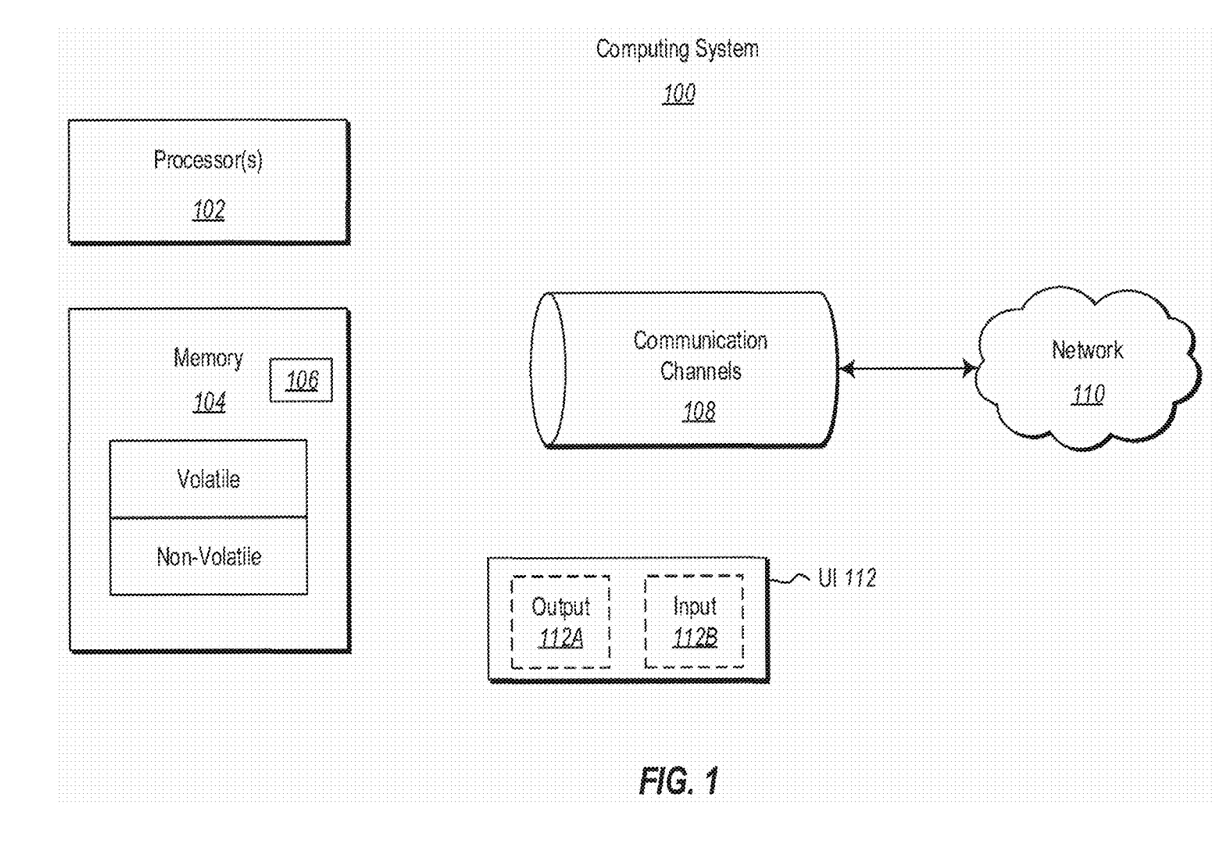
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Figure 2:
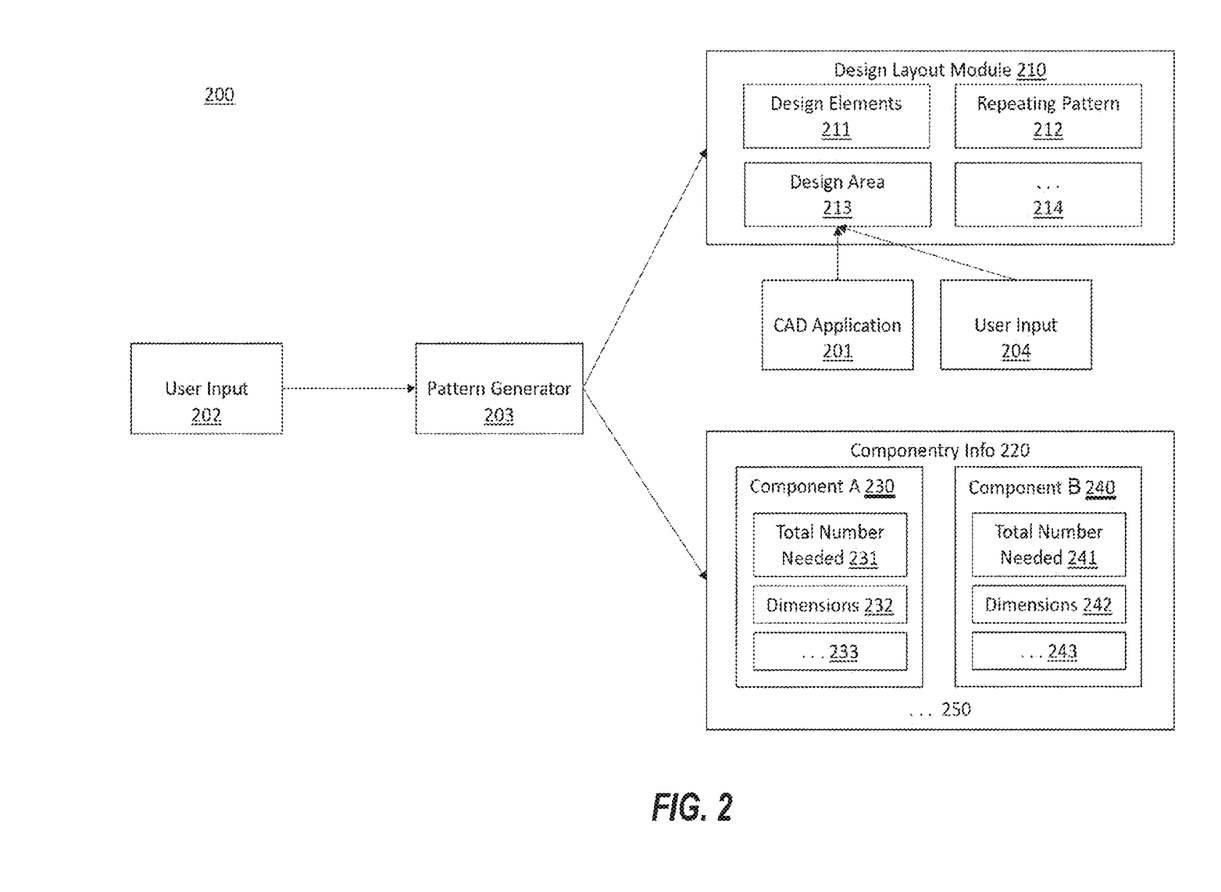
FIG. 2 illustrates a schematic of an environment in which a pattern generator may be implemented.

Having described a computing system with reference to FIG. 1, specific embodiments of generating patterns for architectural product manufacture will now be explained. FIG. 2 illustrates an example environment 200 in which a pattern generator 203 may be implemented. The pattern generator 203 may be a computing system 100 of FIG. 1. The pattern generator 203 may include additional design functions and by itself be a comprehensive CAD application. Alternatively, the pattern generator 203 may be a separate module that may be used in addition to an existing object-oriented design program. Alternatively, or in addition, the pattern generator 203 may also be configured to receive information related to the design area 213 from another CAD application.

As illustrated in FIG. 2, the pattern generator 203 may take inputs from a user 202, and based on these inputs 202 generate one or more visualizations 211, 212 and 213, and component information 220. The one or more visualizations 211, 212 and 213 may also be part of a design layout module 210. The design layout module 210 may take the output of the pattern generator 203 and additional user input or information imported from a CAD application 201 to generate and/or update the design area visualization 213.

The pattern generator 203 may generate a design element visualization 211 showing multiple design elements that the user can choose from and a design area visualization 212 showing a repeating pattern that is being designed by the user. The information related to the design area 213 may be received via a user input 204 directly. Alternatively, such information may be imported from another CAD application 201. The ellipsis 214 represents that there may be any number of visualizations that may be presented to the user and/or additional sub-modules that may be implemented to perform additional functions.

The pattern generator 203 also generates information 220 related to the components required to implement the generated design. For example, a particular design may require two different components, i.e., Component A 230 and Component B 240. The generated information 220 may include the total number of each component needed 231, 241 and the dimensions of each component 232, 242. The ellipsis 233 and 243 represent that additional component information may be generated. For example, the manufacturing cost or purchasing cost of each component may be generated, and total cost of the required components may also be generated. The ellipsis 250 represents that there may be any number of components that are required to implement a design. For example, when the design is for ceiling tile layout for a ceiling area of a particular room, the components required may include one or more different types of tiles, light fixture, T-bars and various connectors. Further, the component information 220 may be stored in a file and/or be presented to a user via a visualization. The component information may also be directly or indirectly sent to another application that is used to manufacture each component as inputs.

As such, the original layout shape of the area to be designed may be imported from another CAD program (or may be drawn by a user within the design area 213). The pattern generator 203 and the design layout module 210 are part of an object-oriented design program. The intelligence of the object-oriented design program may then be used to resolve the pattern and apply components to the resolved lines, points and resultant shapes. The design layout module 210 is configured to accept the pattern design from the pattern generator 203, then resolve the line and point objects to the applicable component objects based on the product type layer and the manufacturer layer. This process may not always be a mapping process. For example, the design layout module might recognize that a specific point in the design represents the end of a run, and might use a different connector type at that point (than it would at another point which wasn't at the end of a run). The design layout module 210 may resolve that connector by understanding the point-line relationships, the end of run positioning, the product type ramifications (ceiling clip versus floor screw) per that layer, and the manufacturer specific ramifications per the manufacturer layer. For example, the design layout module 210 may be configured to determine whether that manufacture have a specific end-run clip, or use the same one everywhere.

The traditional CAD programs often use pre-envisioned hierarchical "if-then" macros to define certain relationships between different components. Unlike these traditional CAD programs, the pattern generator 203 described herein uses an object-oriented programming paradigm, rather than hierarchical configuration routines, such that each line, point, or component is generated as an object, and a relationship between each object to any other object can self-resolve through the software objects. Each software object may also be associated with functions that are specific to the type of component represented by the software object.

For example, a software object representing a ceiling tile may be associated with functions relating to the maximum weight of a ceiling tile, functions relating to tile-to-lighting interfaces, functions relating to sound proofing, and other similar functions. As such, a ceiling-tile software object may comprise a function of tile1.size( ) that is configured automatically size the ceiling tile to fit within a given spot in the pattern design. Additionally, the ceiling-tile software object may be able to pass information to neighboring ceiling tiles. For example, the above referenced ceiling tile may pass information about its own dimensions to a tile on the immediate left of itself using functions such as tile1.lefttile (size). Using this and similar functions, each ceiling tile can both automatically adjust its own settings and also communicate information from one ceiling tile to another. As such, the ceiling tiles can "self-resolve" to fit a given user desire.

As an additional example, an object associated with a tile piece for a floor pattern may be associated with a grout-width function, a wall interface function, a different-floor-type interface function, and other functions that are specific to floor tiling. Each of these software objects may also provide functionality relating to the orientation and placement of the different tile pieces. Additionally, each software object may be able to communicate with neighboring floor tiles or objects.

For example, a software object representing a floor tile may comprise a function of floortile1.wallinterface(left) that is configured to automatically position and place the floor tile when a wall is to the immediate left of the floor tile. The function may be called by the floor tile when it identifies a wall interface to its left or it may be called by a software object associated with the wall. Using this and similar functions, each floor tile can both automatically adjust its own configuration and also communicate information from one floor tile to another. As such, the ceiling floor tiles can "self-resolve" to fit a given user desire.

Additionally, in some embodiments, the pattern design itself may comprise a single pattern-design software object that includes functions specific to the pattern design. The pattern-design software object may further contain or otherwise be associated with each software object that is associated with each component in the pattern design. For example, the pattern-design software object may comprise functions relating to the positioning, sizing, and orientation of the pattern design. The pattern-design software object may further be configured to call functions associated with one or more software objects associated with the components of the pattern design, such as the ceiling tiles or floor tiles that make up the design.

For example, a designer may desire to rotate the pattern design 90-degrees. To implement such a shift, the pattern design may use a function such as design1.rotate(90). Such a function may cause the entire pattern design to rotate 90-degrees. Further, in some embodiments, such a function is performed by the pattern design software object issuing a command to each software object associated with each component of the pattern design to rotate 90-degrees. As such, the pattern design object can perform functions on the entire pattern design by causing the software objects associated with the components of the pattern design to perform specific functions.

An example of self-resolve may be that when 3 Object lines are drawn to form a triangle shape, that triangle is forced to fit lane-line to lane-line, and a triangle shaped Object is then created. In some instances, such as ceilings, the creation of a closed-shaped Object will automatically create a physical component Object (ceiling tile) to fit in that space of the design.

The following discussion now refers to a number of methods and method acts that may be performed by the pattern generator 203 of FIG. 2. Although the method acts may be disused in a certain order or illustrated in a flow chart as occurring in a particular order, no particular ordering is required unless specifically stated, or required because an act is dependent on another act being completed prior to the act being performed.

Figure 3:
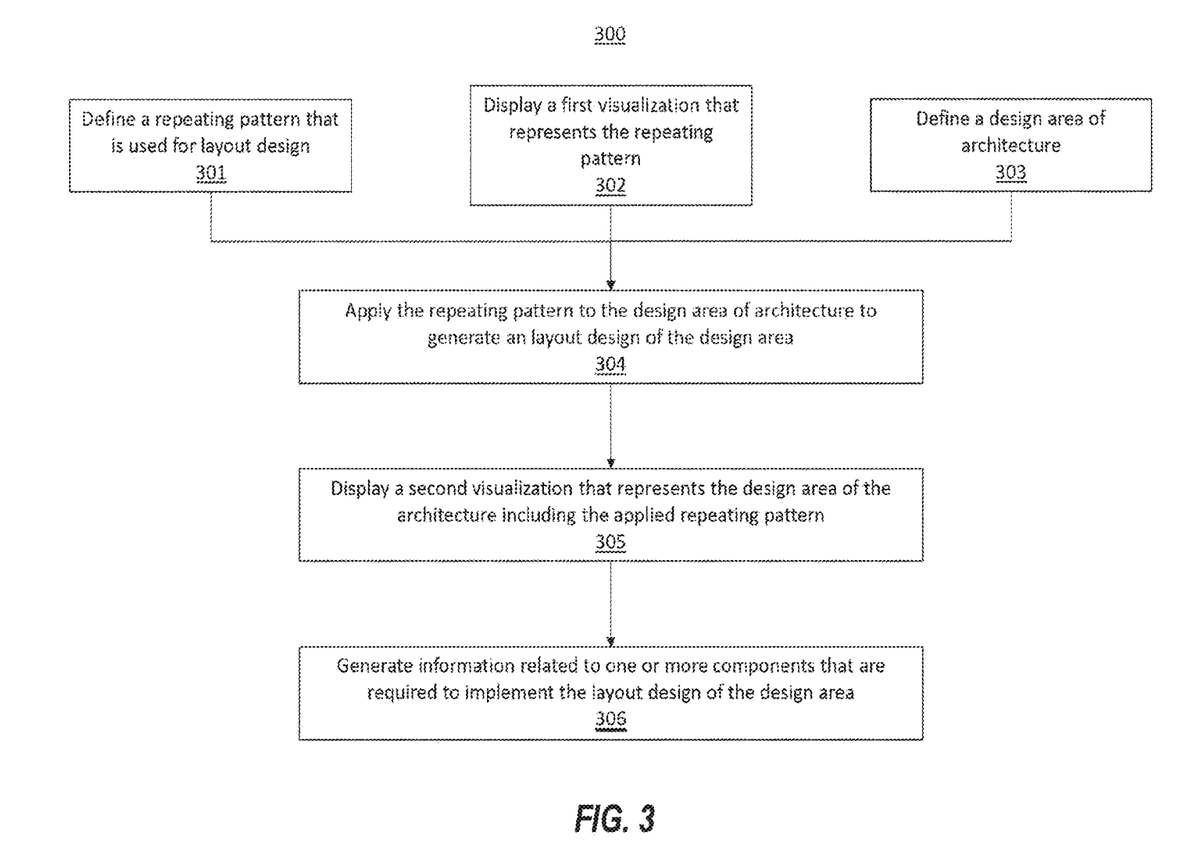
FIG. 3 illustrates a flow chart of an example method for generating a pattern for architecture product manufacture.

FIG. 3 illustrates a flow chart of an example method 300 for generating a pattern for architecture product manufacture. Referring to FIG. 3, the method 300 includes defining a repeating pattern that is used for architecture design 301 and displaying a first visualization that represents the repeating pattern 302. The method 300 also includes defining a design area of architecture 303. The acts of defining a repeating pattern 301, displaying the first visualization that represents the repeating pattern 302, and defining the design area of architecture may be performed simultaneously or in any order.

The design area may be defined as a geometric shape. In some embodiments, the geometric shape may be a polygon, including three or more sides. Such a polygon may be defined by the length of each one of the three or more sides. Further, in some embodiments, the design area may be defined by a user input that defines one or more parameters of the design area. Alternatively, or in addition, the design area may be defined by receiving information from another CAD application, because sometimes the design of a particular design area is a portion of a larger design project, and the larger design project has already included the dimensions of each design areas in the CAD application.

The method 300 also includes automatically applying the designed repeating pattern to the design area of architecture to generate an architecture design of the design area 304 and displaying a second visualization that represents the design area of architecture including the applied repeating pattern 305. The applying the repeating pattern to the design area 304 may include automatically laying out the repeating pattern to fill the design area of architecture in a pre-determined default orientation and/or a pre-determined/default position. Alternatively, or in combination, the applying the repeating pattern to the design area may include receiving a user input indicating an orientation and/or a position of the repeating pattern that is applied to the design area, and laying out the repeating pattern to fill the design area of architecture based on the user input.

The automatically applying the designed repeating pattern to a large design area may save a designer substantial effort and time, in comparison to conventional CAD systems which often require the designer to manually place each components on the large design area, and any size, position, and/or orientation adjustment may trigger a complete manually redesign of the layout.

The principles described herein do not require the designer to redesign the whole design area if any change needs to be made. Instead, the designer only needs to redesign the repeating pattern, which is often a small rectangular area that includes a few components. Further, when the orientation or position of the layout needs to be adjusted, the designer can use a few simple mouse gestures or text inputs to complete such an adjustment.

After the layout design is finalized, the information related to one or more components that are required to implement the layout design of the design area is generated 306. Such information may be stored as a data file that is human readable or machine readable. Alternatively, or in combination, the information may be presented in another visualization. The other visualization may display each type of component required to implement the design in the text form. The visualization may also display an image of each type of the required components including the shape and dimension of the corresponding component. Alternatively, or in combination, the information may also be in a format that may be used as an input of a manufacturing application or merchant ordering application. The manufacturing application may be configured to use the information received to manufacture at least some of the components automatically. The merchant ordering application may be configured to use the information received to order at least some of the components automatically.

Figure 4:
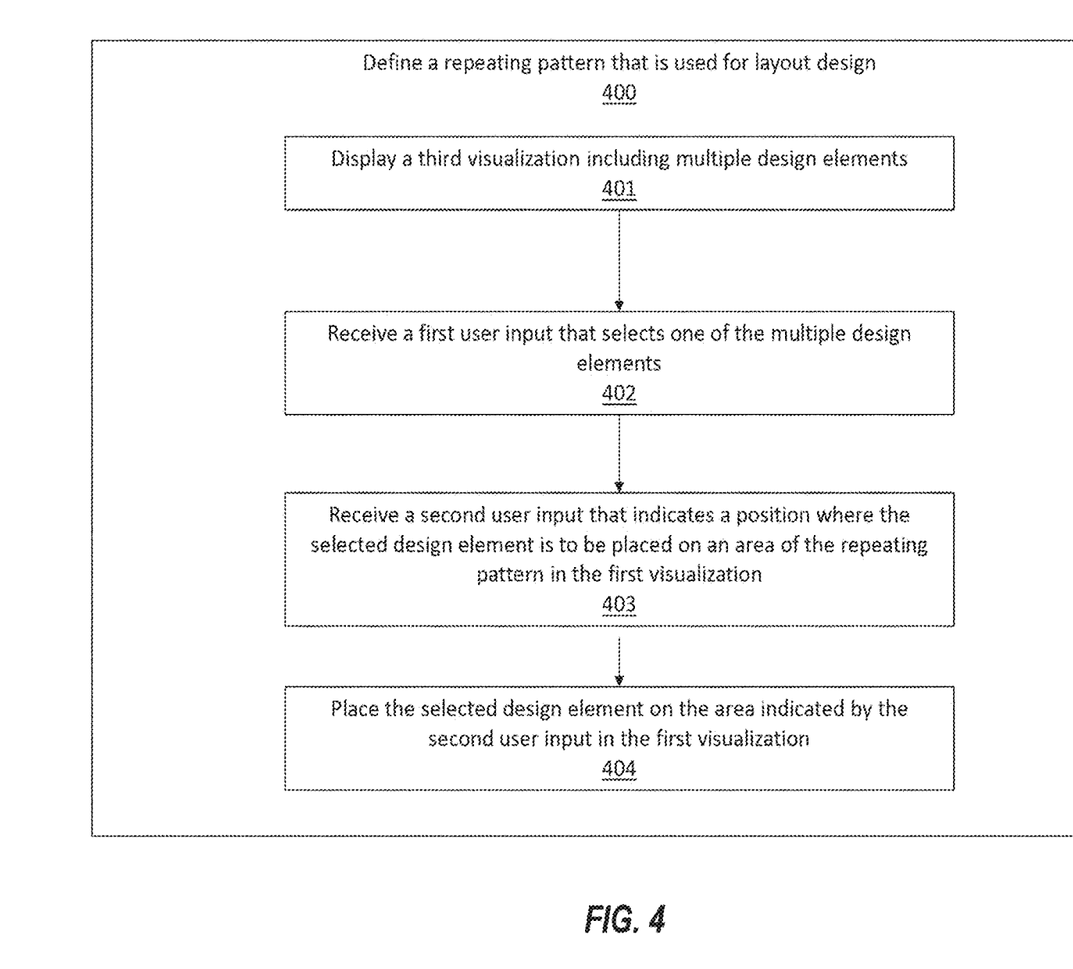
FIG. 4 illustrates a flow chart of an example method for defining a repeating pattern that is used for the layout design.

FIG. 4 illustrates a flow chart of an example method 400 for defining a repeating pattern that is used for the layout design, which may correspond to an embodiment of step 301 of method 300. The method 400 may include displaying a third visualization that includes multiple design elements 401. The method 400 may also include receiving a first user input that selects one of the multiple design elements 402 and receiving a second user input that indicates a position where the selected design element is to be placed on an area of the repeating pattern in the first visualization 403. Thereafter, in response to the first and second user inputs, the selected design element is placed on the area indicated by the second user input in the first visualization 404.

The multiple design elements may include different geometric elements. The geometric elements may include, but not limited to, different polygons, parallel lane lines, and/or T-lines. Parallel lane lines may be the lines parallel to one or more side of the shape of the repeating pattern. Parallel lane lines may also be lines parallel to predetermined default lane lines. T-lines are the lines that have an angle from the parallel lane lines. T-lines often represent a physical component in the architecture design. For example, a T-line may be a ceiling T-bar section or a cross beam. A variety of connectors and/or connection features of the manufactured produced may be implemented in combination with the T-bars to secure the tiles in place.

Figure 5:
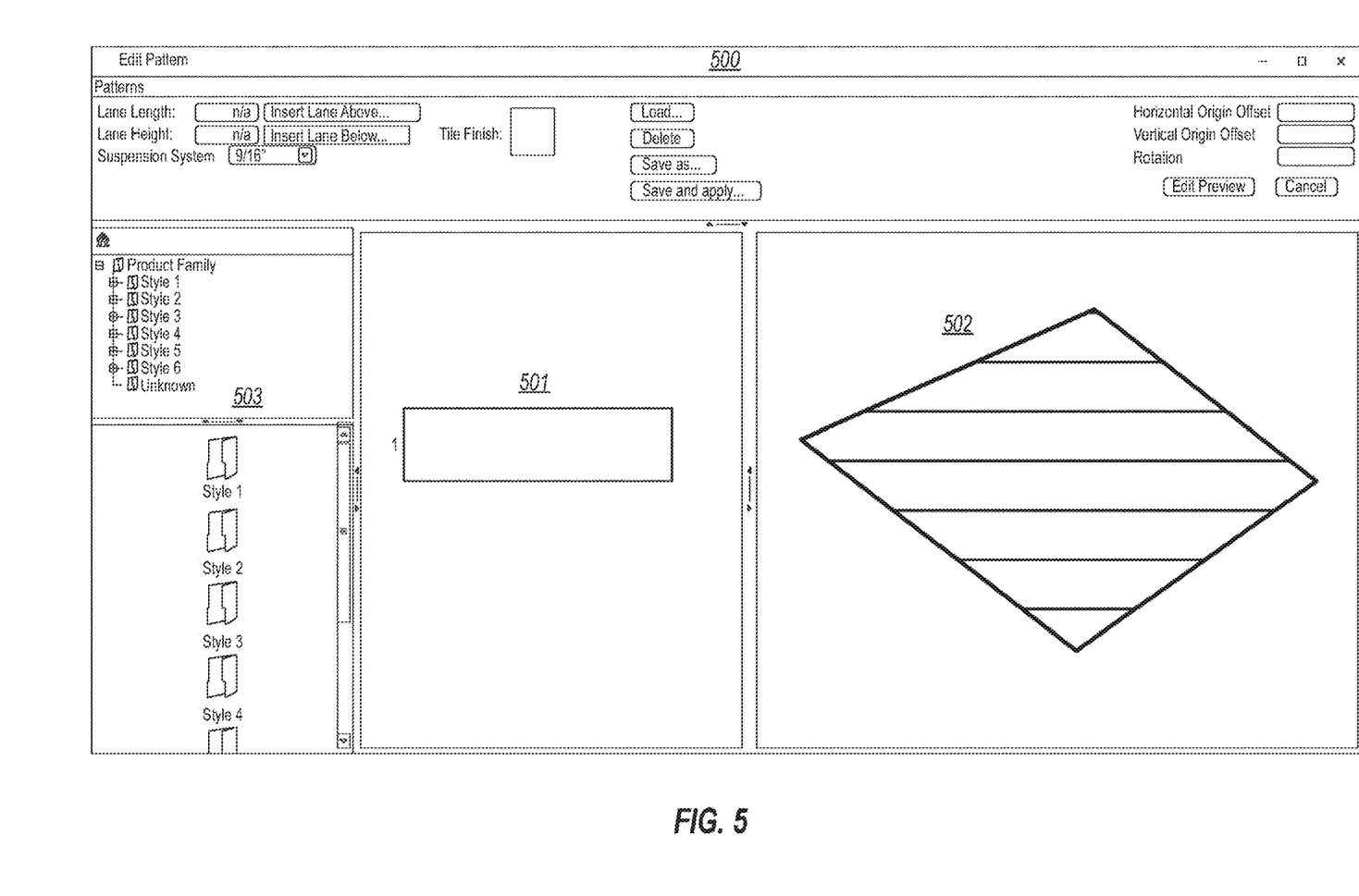
FIG. 5 illustrates an example user interface of the pattern generator that shows a repeating pattern being a default repeating pattern including two default lane lines.

FIGS. 5 through 8 illustrate example user interface of the pattern generator described above. FIG. 5 illustrates a user interface of the pattern generator that shows a default repeating pattern including two default lane lines to form one default lane. Referring to FIG. 5, the user interface 500 includes a first visualization 501 that illustrates the repeating pattern being a default shaped pattern including two default lane lines. The shorter sides of the rectangle represent the pattern repetition spacing. For example, if the short lines are 96 inches apart, the pattern designed within the lanes will be repeated every 96 inches. The shorter sides of the rectangle may not represent any physical manufactured components, and may even be omitted in some embodiments leaving the starting shape as simply two elongated parallel lines to form a parallel "lane".

The user interface 500 also includes a second visualization 502 that illustrates the shape of the design area that is filled with the repeating patterns (i.e., the default shape illustrated in the first visualization 501). As illustrated, the shape of the design area is a polygon. The profile of the polygon may be entered by a user or imported from another CAD application. Upon closing the profile input of the polygon representing the design area, the default pattern lane will appear within the polygon to scale, spanning the entire width of the polygon, and repeated per the initial lane spacing to fill the entire height of the design area. The initial default location of the pattern lane within the polygon may be determined by the origin of the polygon shape or otherwise, but in any case, the pattern lane(s) can be repositioned or rotated as desired.

The user interface 500 also includes a third visualization 503 that displays multiple design elements that a user may choose from. In this case, the user did not select any of the design elements, thus, the default pattern is used to design the layout of the design area.

Figure 6:
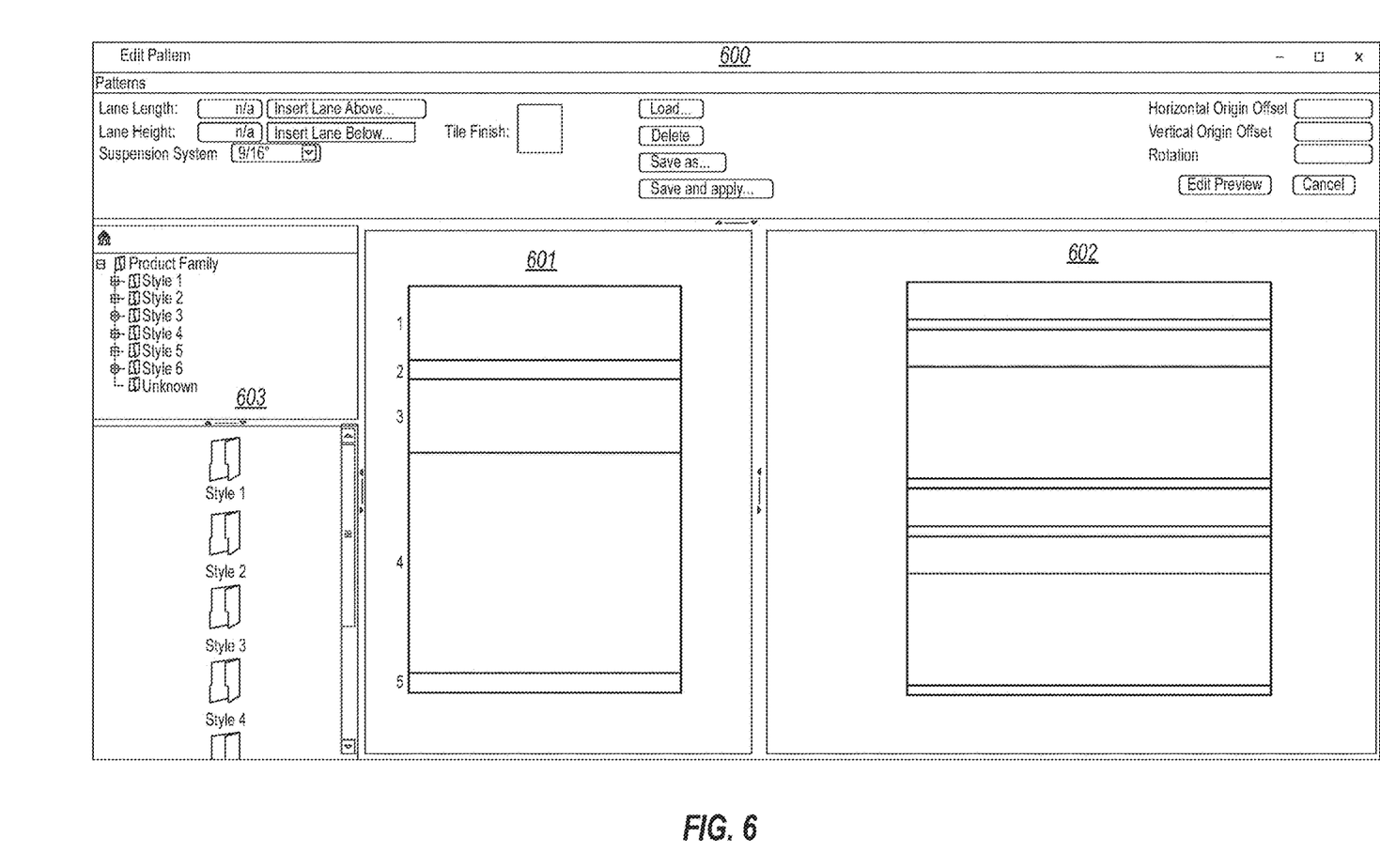
FIG. 6 illustrates an example user interface of the pattern generator that shows a repeating pattern including multiple lane lines drawn by a user.

FIG. 6 illustrates another example user interface 600 of the pattern generator that shows a repeating pattern including multiple lane lines drawn by a user in addition to the two default lane lines. Similar to the user interface 500, the user interface 600 includes a first visualization 601, a second visualization 602, and a third visualization 603. The first visualization 601 illustrates the repeating pattern designed by the user. In particular, additional elongated lines are added parallel to the initial default lane lines. The spacing between any two elongated lane lines may vary as required to accomplish the applicable design. As additional lane lines are added, the pattern within the design area polygon illustrated in the second visualization 602 will adjust to reflect the additional lines included in the pattern.

Figure 7:
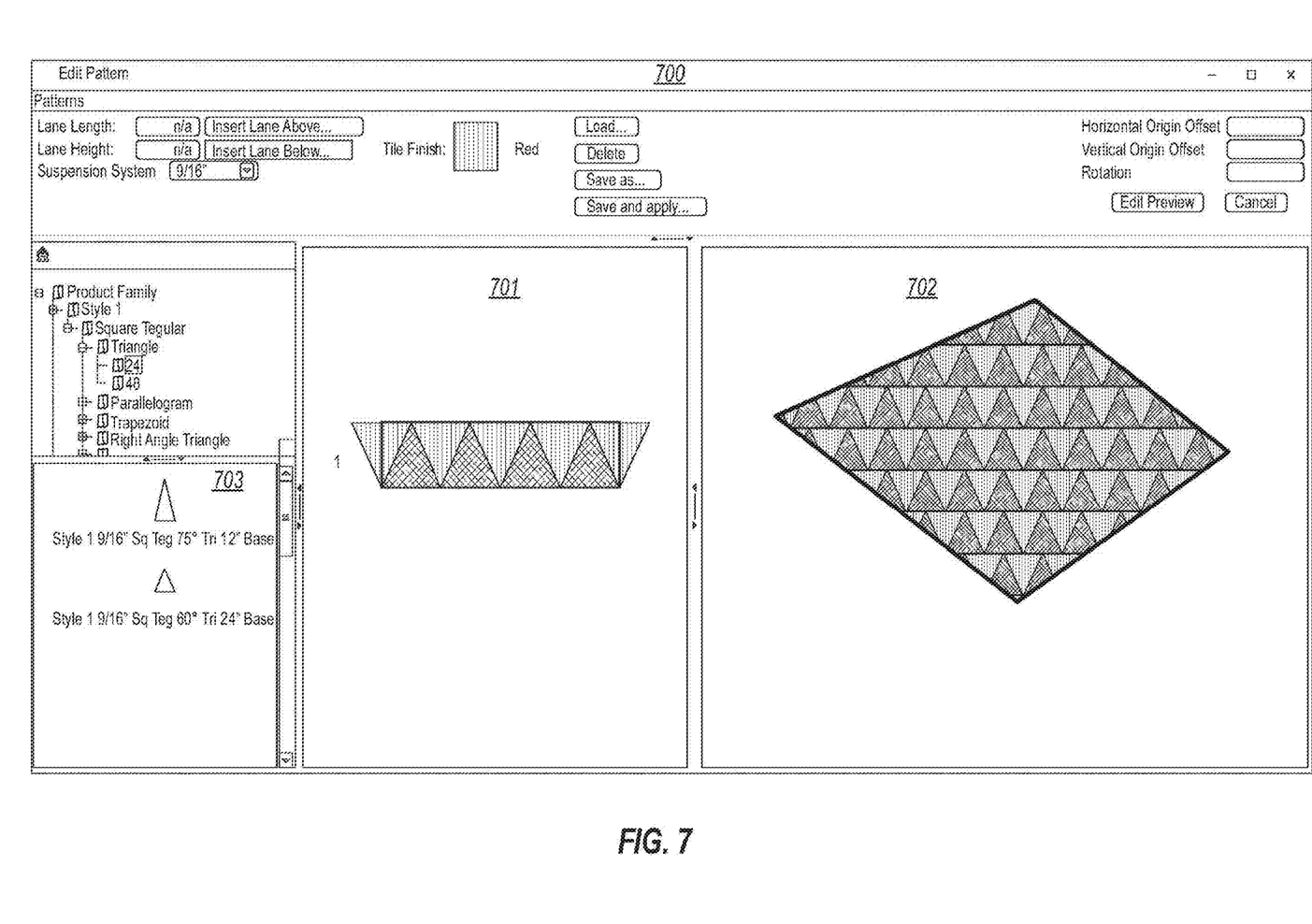
FIG. 7 illustrates an example user interface of the pattern generator that shows a repeating pattern including multiple T-lines in addition to the two default lane lines.

Furthermore, between any two lane lines, other lines can be drawn at any angle, starting from one lane line to the next. The lines that are not parallel with the lane lines are called T-lines. Drawing T-lines creates new shapes to be repeated in the pattern. Any such lines may also represent a physical component in the real world, such as a ceiling T-bar section or cross beam. Where applicable, intersections of these T-lines and lane lines may also be mapped to the applicable connector or connection features of the manufactured product represented by the design. FIG. 7 illustrates such a layout design.

FIG. 7 illustrates an example user interface 700 of the pattern generator that shows a repeating pattern including multiple T-lines in addition to the two default lane lines. Referring to FIG. 7, the user interface 700 also includes a first visualization 701, a second visualization 702, and a third visualization 703. The first visualization 701 illustrates a repeating pattern including a pair of default lane lines and multiple T-lines. The second visualization 702 illustrates that the repeating pattern illustrated in the first visualization 701 is applied to the polygon design area. The T-lines may be generated by manually drawing a cross line and/or selecting another geometric shape and placing the geometric shape in areas of the repeating pattern illustrated in the first visualization 701.

Further, as illustrated in FIG. 7, the third visualization 703 shows multiple design elements that the user can choose from, including (but are not limited to) triangle, parallelogram, trapezoid, and right angle triangle. The user of the user interface 700 appears to have selected a triangle design element that is defined as Style 1$\frac{9}{16}$" Sq Teg 60' Tri 24" Base. The user may indicate where the triangle design element is to be placed on the repeating pattern illustrated in the first visualization 701. In response to the user indication, the system may stamp the selected pattern at the place where the user indicated.

Further, the repeating pattern can be manipulated as desired, by adding or subtracting lane lines, T-lines or stamped shapes, and the design will continually resolve to represent the current repeating pattern within the design area polygon.

Figure 8:
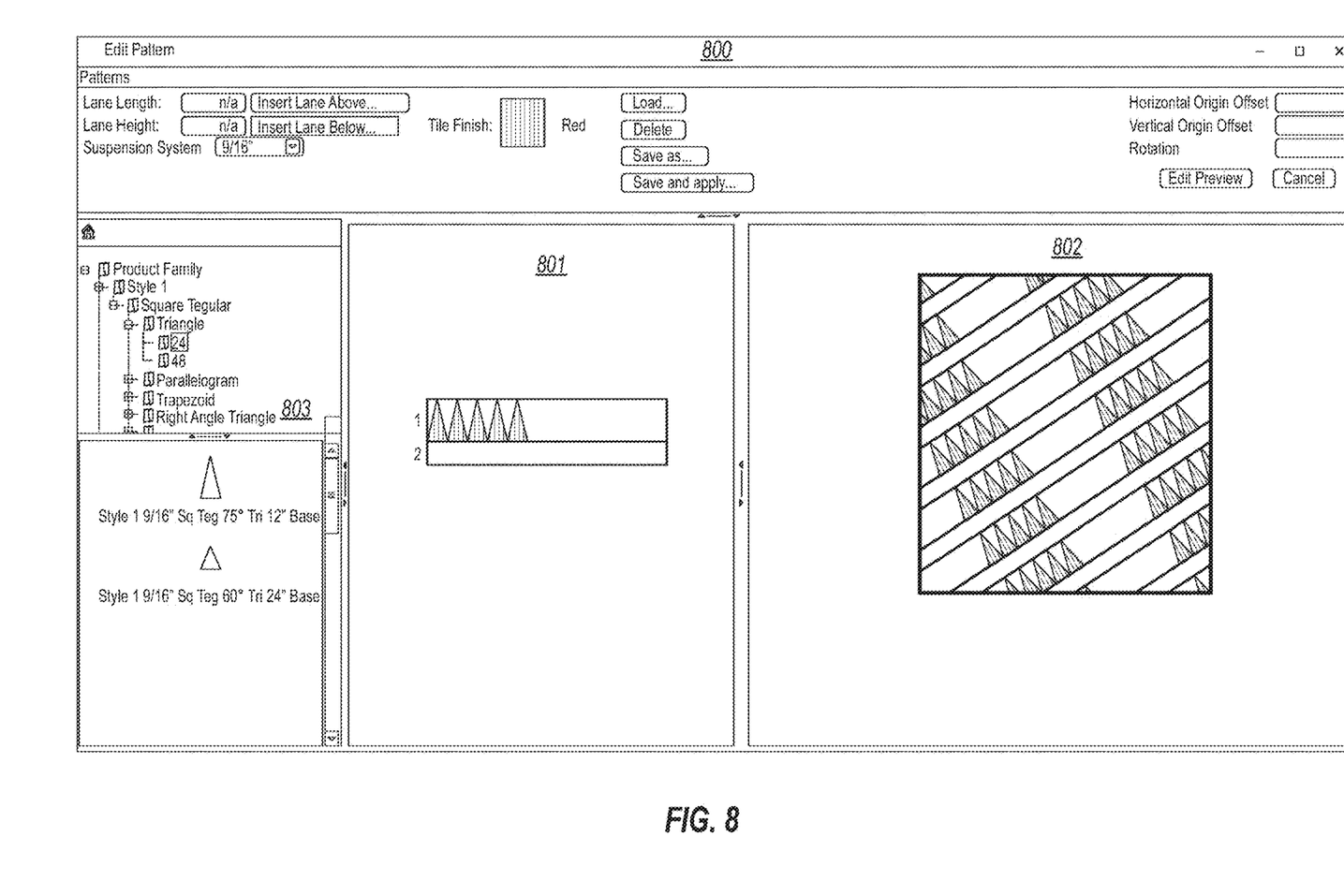
FIG. 8 illustrates an example user interface of the pattern generator that shows a repeating pattern including an additional lane line and multiple T-lines in addition to the two default lane lines.

FIG. 8 illustrates an example user interface 800 of the pattern generator that shows a repeating pattern including additional lane lines and multiple T-lines in addition to the default lane lines. Referring to FIG. 8, the user interface 800 also includes a first visualization 801, a second visualization 802, and a third visualization 803. The first visualization 801 illustrates the repeating pattern that is to be applied to the design area polygon illustrated in the second visualization 802. The repeating pattern here not only includes multiple T-lines, but also includes an additional parallel lane line in addition to the two default lane lines. The multiple T-lines may be generated by a user manual drawing or by stamping multiple triangles on the design pattern. As illustrated in the third visualization 803, the user here appears to have selected and stamped the triangle shape defined as Style 1$\frac{9}{16}$" Sq Teg 75" Tri 12".

Further, the user of the user interface 800 also adjusted the orientation of the repeating pattern in the design area polygon. By default, the layout of the repeating patterns is likely to be horizontal or vertical. However, if the user prefers the layout to be tilted at a particular angle, the user may adjust the layout by a text input of the desired particular angle, a mouse gesture input, and/or a touch screen input to rotate and/or move the layout pattern.

After the design is finalized, the pattern generator then maps the design to one or more manufactures' one or more products. When mapped to a manufacturer's product, the components required to complete the design may be automatically generated. This could include beams, T-bars, etc., as represented by the lines, as well as connectors connection details and tiles such as ceiling, floor or wall tiles. Tiles are represented by the spaces formed by the placement of the T-lines between the lane lines of the pattern design.

In an object-oriented design application, the mosaic pattern generation functionality may be maintained as a generic design tool on its own layer (repository) in order to capture the intent of the pattern layout (intent model).

Separate layers (or repositories) may be maintained for applicable product type layers (such as ceilings, floors or walls). These layers may contain product types and behaviors consistent with most manufacturers within that vertical market, in order to map specific product type components to the intent model. For example, when a ceiling layer is utilized with the intent model, the lane lines and T-lines may be mapped to T-bar components as a default (with applicable beams or other ceiling choices as selectable options instead) while the shapes defined by the lines are mapped to ceiling tiles. But when the intent model is used with a wall layer, the lane lines could be mapped to vertical structural members, T-lines to horizontal structural members, and the spaces defined by the lines mapped to aesthetic wall panels. In some embodiments, these "mappings" are performed by software objects associated with each respective component of the design.

In addition, on top of the product type layer, there may be a manufacturer specific layer, whereby the manufacturer-specific T-bar or ceiling tile is mapped to the corresponding product. For example, one manufacturer may require ceiling tiles to be cut $\frac{1}{8}$" in undersized in each direction, while another may require $\frac{1}{16}$" offset. By mapping the manufacturer specific components to the product type (which is in turn mapped to the pattern intent model), the object-oriented software can output exact data for the automated manufacture of the components.

Figure 9:
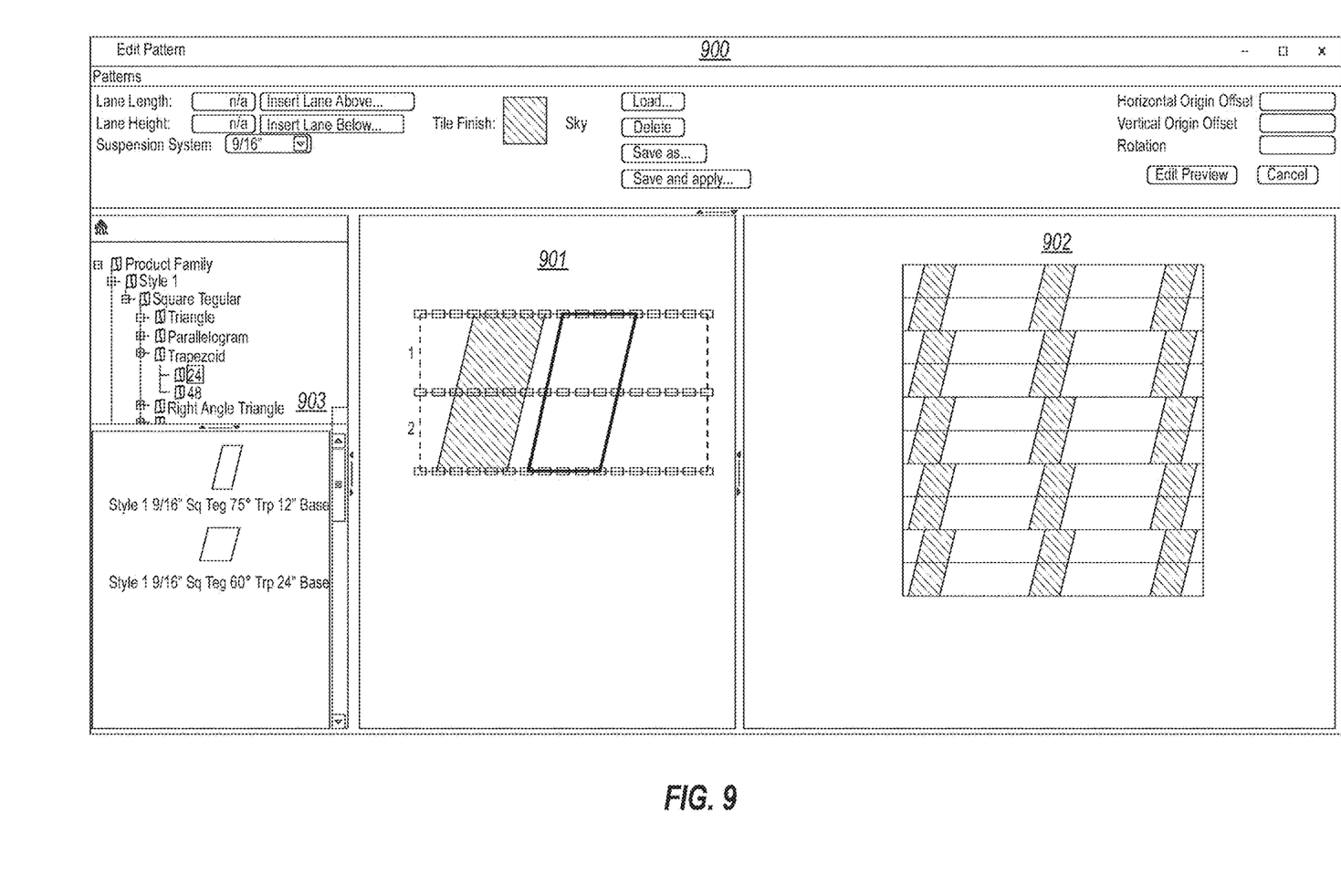
FIG. 9 illustrates an example user interface of the pattern generator that shows a floating tile option.

FIG. 9 illustrates an example user interface 900 of the pattern generator that shows a floating tile option. Referring to FIG. 9, the user interface 900 also includes a first visualization 901 and a second visualization 902. The first visualization 901 illustrates the repeating pattern that is to be applied to the design area polygon illustrated in the second visualization 902. The repeating pattern here not only includes multiple T-lines, but also includes an additional parallel lane line in addition to the two default lane lines. The multiple T-lines may be generated by a user manual drawing or by stamping multiple triangles on the design pattern.

In at least one embodiment, the "floating tiles" comprise tiles that are not constricted to lanes and can span across lanes. The floating tiles provide an optional tile placement system that allows mosaic tiles to live outside the constrictions of traditional mosaic lanes. In at least one embodiment, floating lanes sit on top of the whole mosaic itself and tiles can be placed within the floating lanes. Such floating lanes and floating tiles allow for significant customization and unique artistic expressions with a mosaic pattern.

The floating tiles can be placed within the pattern editor (e.g., first visualization 801) to allow placement of these tiles. The floating tiles can then be placed within a floating lane that is independent of the position and location of the traditional lanes. The floating tiles can replicate the same way tiles do as explained above-on a per lane basis, repeating until the edges of the mosaic perimeter.

In at least one embodiment, a new termination tile system provides a user with greater control over tiles at the start and end of each floating lane. This allows for a user to manage edge conditions that may otherwise not be workable. As such, a user can specify a particular pattern of floating tiles and then dictate what happens when the pattern terminates within the mosaic that the floating tiles are applied to. A user may similarly have the ability to edit mosaic tees inside the editor after placement, deleting them, and/or shifting them horizontally.

Accordingly, one will appreciate that the disclosed systems and methods provide novel and innovative ways to design and implement mosaic patterns within an architectural design program. In particular, associating each design element with a software object provides significant advances in the art relating to the ability of the elements to self-resolve. Such features provide significant benefits to both end users designers and end user construction workers.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having thereon computer-executable instructions that are structured such that, when executed by the one or more processors, cause the computing system to:
   define a repeating pattern that is used for a layout design, wherein:
   multiple components within the layout design are associated with their own respective software object,
   each software object is associated with one or more functions that are specific to each component, and
   each software object is configured to self-resolve by passing information to another software object associated with a neighboring component within the layout design;
   display a first visualization that illustrates the repeating pattern;
   define a design area of architecture;
   apply the repeating pattern to the design area of architecture to complete the layout design of the design area, wherein each software object self-resolves at least one aspect of the layout design based upon the passing of the information to the other software object;
   display a second visualization that represents the design area of architecture including the applied repeating pattern; and
   generate information related to one or more components that are required to implement the architecture design of the design area;
   wherein the defining a repeating pattern further includes displaying a third visualization that represents a plurality of design elements that may be implemented in the repeating pattern.

2. The computing system of claim 1, wherein the defining the repeating pattern further includes receiving a first user input that selects one of the plurality of design elements that is to be implemented into the repeating pattern.

3. The computing system of claim 2, wherein the defining the repeating pattern further includes:
   receiving a second user input that indicates a position where the selected design element is to be placed in an area of the repeating pattern in the first visualization, and
   placing the selected design element in the area of the repeating pattern in the first visualization.

4. The computing system of claim 1, wherein the plurality of design elements includes a plurality of different geometric elements.

5. The computing system of claim 4, wherein the plurality of different geometric elements includes one or more of the following (1) a polygon, (2) a parallel lane line, and (3) a T-line.

6. The computing system of claim 1, wherein the design area is a defined as a geometric shape.

7. The computing system of claim 6, wherein the geometric shape is a polygon, including three or more sides.

8. The computing system of claim 7, wherein the polygon is defined by a length of each one of the three or more sides.

9. The computing system of claim 1, wherein the defining the design area includes receiving a third user input that defines one or more parameters of the design area.

10. The computing system of claim 1, wherein the defining the design area includes receiving information related to the design area from a CAD application.

11. The computing system of claim 1, wherein the applying the repeating pattern to the design area includes automatically laying out the repeating pattern to fill the design area of architecture in a predetermined orientation and/or a predetermined position.

12. The computing system of claim 1, wherein the applying the repeating pattern to the design area includes:
    receiving a user input indicating an orientation and/or a position of the repeating pattern that is applied to the design area; and
    laying out the repeating pattern to fill the design area of architecture based on the user input.

13. The computing system of claim 1, wherein the generated information related to the one or more components includes information related to one or more types of tiles, one or more beams, T-bars, and/or connectors that are required to implement the layout design of the design area.

14. The computing system of claim 13, wherein the generated information related to one or more beams and/or T-bars includes a total number of beam or T-bars that are required and/or a length of each of the one or more beams and/or T-bars.

15. The computing system of claim 13, wherein the generated information related to one or more tiles includes a shape of each type of tiles and/or a total number of the corresponding type of tiles that are required to implement the layout design.

16. The computing system of claim 1, wherein the instructions further cause the computing system to automatically manufacture the components of the architecture design based on the generated information.

17. A method for automatically generating mosaic pattern for architectural product manufacture:
    defining a repeating pattern that is used for a layout design, wherein:
    multiple components within the layout design are associated with their own respective software object,
    each software object is associated with one or more functions that are specific to each component, and
    each software object is configured to self-resolve by passing information to another software object associated with a neighboring component within the layout design;
    displaying a first visualization that illustrates the repeating pattern;
    defining a design area of architecture;
    applying the repeating pattern to the design area of architecture to complete the layout design of the design area, wherein each software object self-resolves at least one aspect of the layout design based upon the passing of the information to the other software object;
displaying a second visualization that represents the design area of architecture including the applied repeating pattern; and
generating one or more components that are required to implement the layout design of the design area;
wherein the defining a repeating pattern further includes displaying a third visualization that represents a plurality of design elements that may be implemented in the repeating pattern.

18. The method of claim 17, wherein the defining the repeating pattern further includes:
receiving a second user input that indicates a position where a selected design element is to be placed in an area of the repeating pattern in the first visualization, and
placing the selected design element in the area of the repeating pattern in the first visualization.

19. A computer program product comprising one or more computer-readable storage media having stored thereon computer-executable instructions that are structured such that, when executed by one or more processors of a computing system, cause the computing system to perform a method for automatically generating mosaic pattern for architectural product manufacture:
defining a repeating pattern that is used for a layout design, wherein:
multiple components within the layout design are associated with their own respective software object,
each software object is associated with one or more functions that are specific to each component, and
each software object is configured to self-resolve by passing information to another software object associated with a neighboring component within the layout design;
displaying a first visualization that illustrates the repeating pattern;
defining a design area of architecture;
applying the repeating pattern to the design area of architecture to complete the layout design of the design area, wherein each software object self-resolves at least one aspect of the layout design based upon the passing of the information to the other software object;
displaying a second visualization that represents the design area of architecture including the applied repeating pattern; and
generating one or more components that are required to implement the layout design of the design area;
wherein the defining a repeating pattern further includes displaying a third visualization that represents a plurality of design elements that may be implemented in the repeating pattern.

\* \* \* \* \*